United States Patent [19]

Dixon et al.

[11] Patent Number: 4,902,185
[45] Date of Patent: Feb. 20, 1990

[54] GRAIN SPREADER

[76] Inventors: Carl R. Dixon, Rte. 2, Box 24A, Weiner, Ark. 72479; Jackie R. Anschultz, Box 213, Fisher, Ark. 72427

[21] Appl. No.: 761,583

[22] Filed: Aug. 1, 1985

[51] Int. Cl.$^4$ ............................................. B65G 65/32
[52] U.S. Cl. ..................................... 414/301; 193/23; 239/651; 239/688
[58] Field of Search ................ 414/302, 301, 300, 299, 414/293; 239/681, 684, 688, 651; 193/3, 23; 406/162

[56] References Cited

U.S. PATENT DOCUMENTS

| | | | |
|---|---|---|---|
| 1,038,957 | 9/1912 | Pritchett | 193/23 |
| 2,838,153 | 6/1958 | Spencer | 193/23 |
| 3,485,536 | 12/1969 | Donelson, Jr. | 414/301 X |
| 3,576,262 | 4/1971 | Konchesky | 414/301 |
| 3,880,300 | 4/1975 | Uhl | 414/301 X |
| 4,029,220 | 6/1977 | Greaves | 414/302 X |
| 4,040,529 | 8/1977 | Wurdeman et al. | 414/301 |
| 4,397,423 | 8/1983 | Beaver et al. | 414/301 X |
| 4,437,613 | 3/1984 | Olson | 414/301 X |
| 4,623,056 | 11/1986 | Flaugher | 193/23 |

Primary Examiner—David A. Bucci
Attorney, Agent, or Firm—Walker & McKenzie

[57] ABSTRACT

A grain spreader for being mounted within a grain bin directly beneath the inlet opening in the roof structure of the grain bin for causing any grain introduced into the grain bin through the inlet opening to be evenly spread within the grain bin. The spreader includes a funnel positioned directly beneath the inlet opening for initially receiving the grain passing through inlet opening, a chute positioned directly beneath the funnel for receiving grain from the funnel, a motor for causing the chute to slowly rotate, and a deflector positioned beneath the chute for receiving grain from the chute as the chute rotates and for directing the grain radially outward and downward from the funnel.

5 Claims, 3 Drawing Sheets

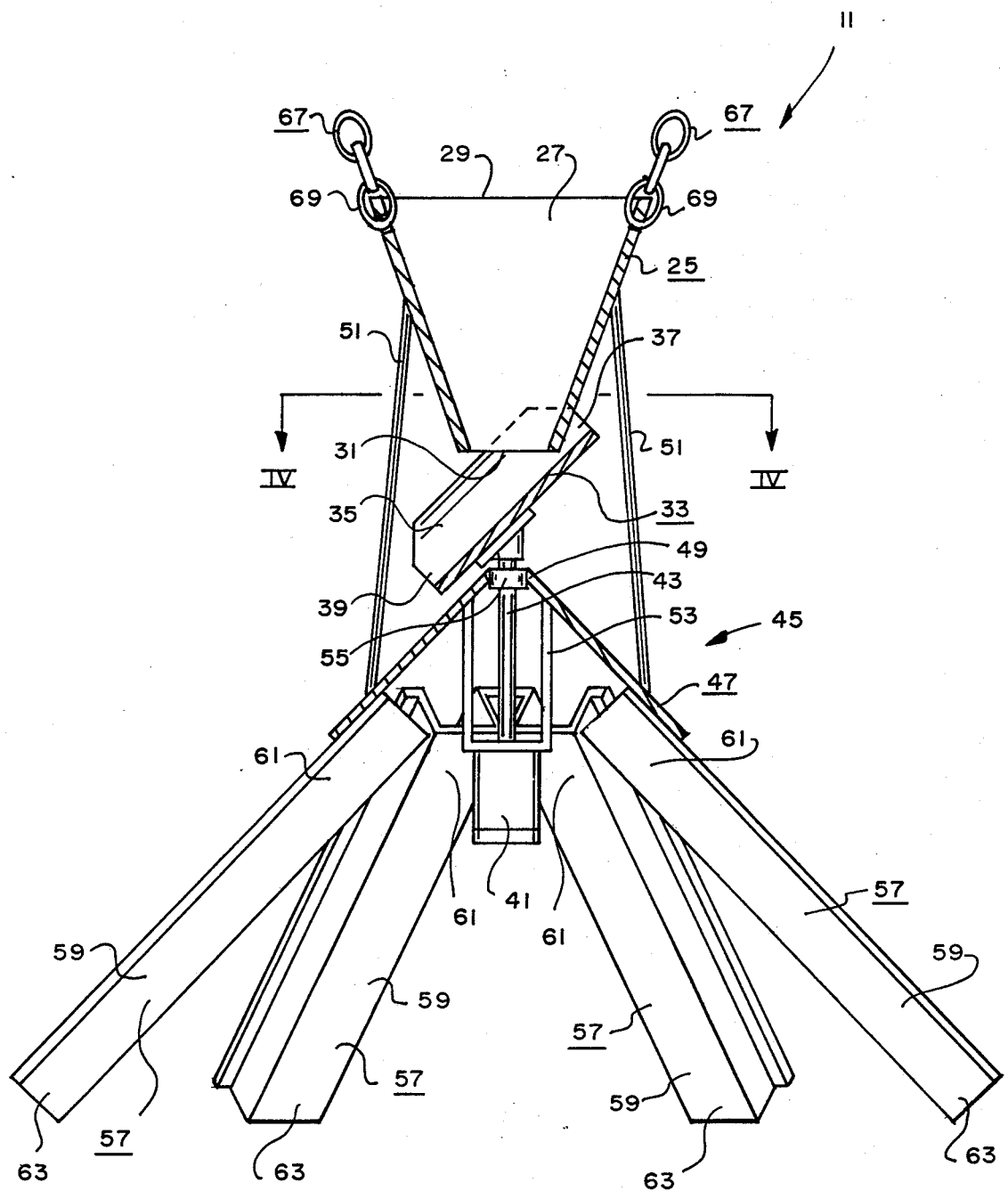

GRAIN SPREADER

BACKGROUND OF THE INVENTION

1. Field of the Invention

The present invention relates to a motorized grain spreader used in conjunction with a grain bin to evenly distribute grain within the grain bin.

2. Description of the Prior Art

Heretofore, various methods have been used in an attempt to evenly and levelly distribute grain and the like within bins. Wurdeman, U.S. Pat. No. 4,040,529 discloses a grain spreader having a hopper disposed beneath an opening in the upper end of a grain bin and having slides disposed beneath the hopper for receiving grain from the hopper, the slides extending downwardly and outwardly from the hopper so that grain flowing therefrom can be distributed around the inside of the bin as the grain is deflected from the slides by deflectors spaced along the slides, the hopper having fins mounted therein at angles with respect to the vertical such that grain hitting the fins will cause the hopper and slides to rotate together.

SUMMARY OF THE INVENTION

The present invention provides an improved grain spreader for use with a grain bin including roof structure having an inlet opening for allowing grain to be introduced into the interior of the grain bin. The grain spreader of the present invention includes, in general, hopper means positioned beneath the inlet opening in the roof structure of a grain bin for initially receiving grain being introduced into the interior of the grain bin through the inlet opening; chute means positioned beneath the hopper means for receiving grain from the hopper means; motor means attached to the chute means for causing the chute means to slowly rotate; and a deflector means positioned beneath the chute means for receiving grain from the chute means as the chute means rotates and for directing the grain received from the chute means outward from the hopper means.

One object of the present invention is to provide an efficient grain spreader that will cause grain being introduced into the interior of a grain bin from an inlet opening in the roof structure of the grain bin to be spread substantially levelly within the grain bin in substantially the same mix as the grain comes from the field.

Another object of the present invention is to provide a grain spreader which will maximize the drying capabilities of grain stored within a grain bin.

Another object of the present invention is to substantially evenly spread grain within a grain bin without cracking and/or packing of the grain.

Another object of the present invention is to provide a grain spreader which reduced the overall drying cost of grain stored within a grain bin.

Another object of the present invention is to provide a grain spreader which prevents the grain from being separated as it is introduced into the grain bin with the heavy particles located in a central core and with lighter materials located about the central core.

BRIEF DESCRIPTION OF THE DRAWINGS

FIG. 3 is an enlarged sectional view substantially as taken on line III—III of FIG. 1 with portions thereof omitted for clarity.

DESCRIPTION OF THE PREFERRED EMBODIMENT

Figure 1:
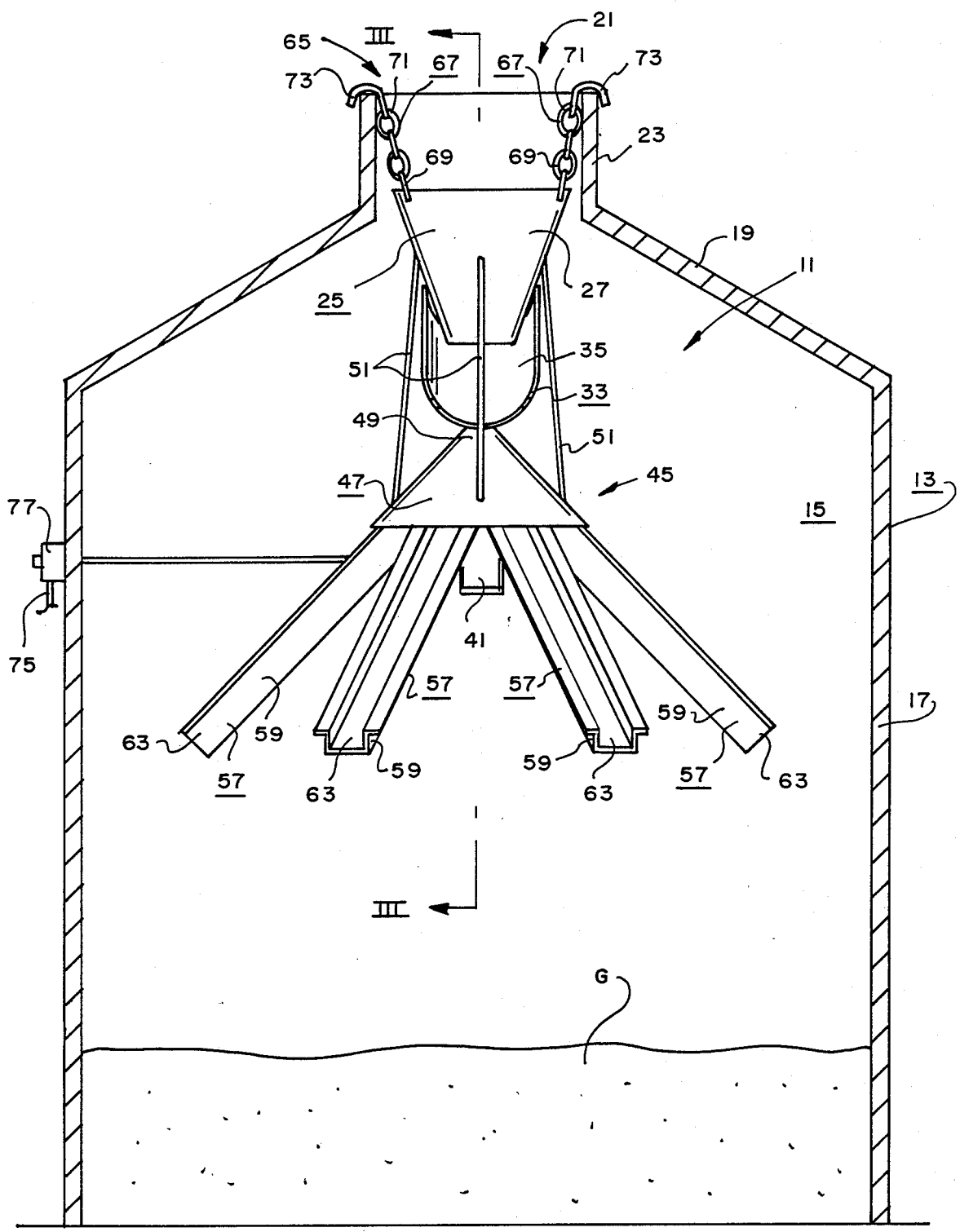
FIG. 1 is a side elevational view of the grain spreader of the present invention, shown mounted within a grain bin with portions of the grain bin broken away for clarity.
Figure 2:
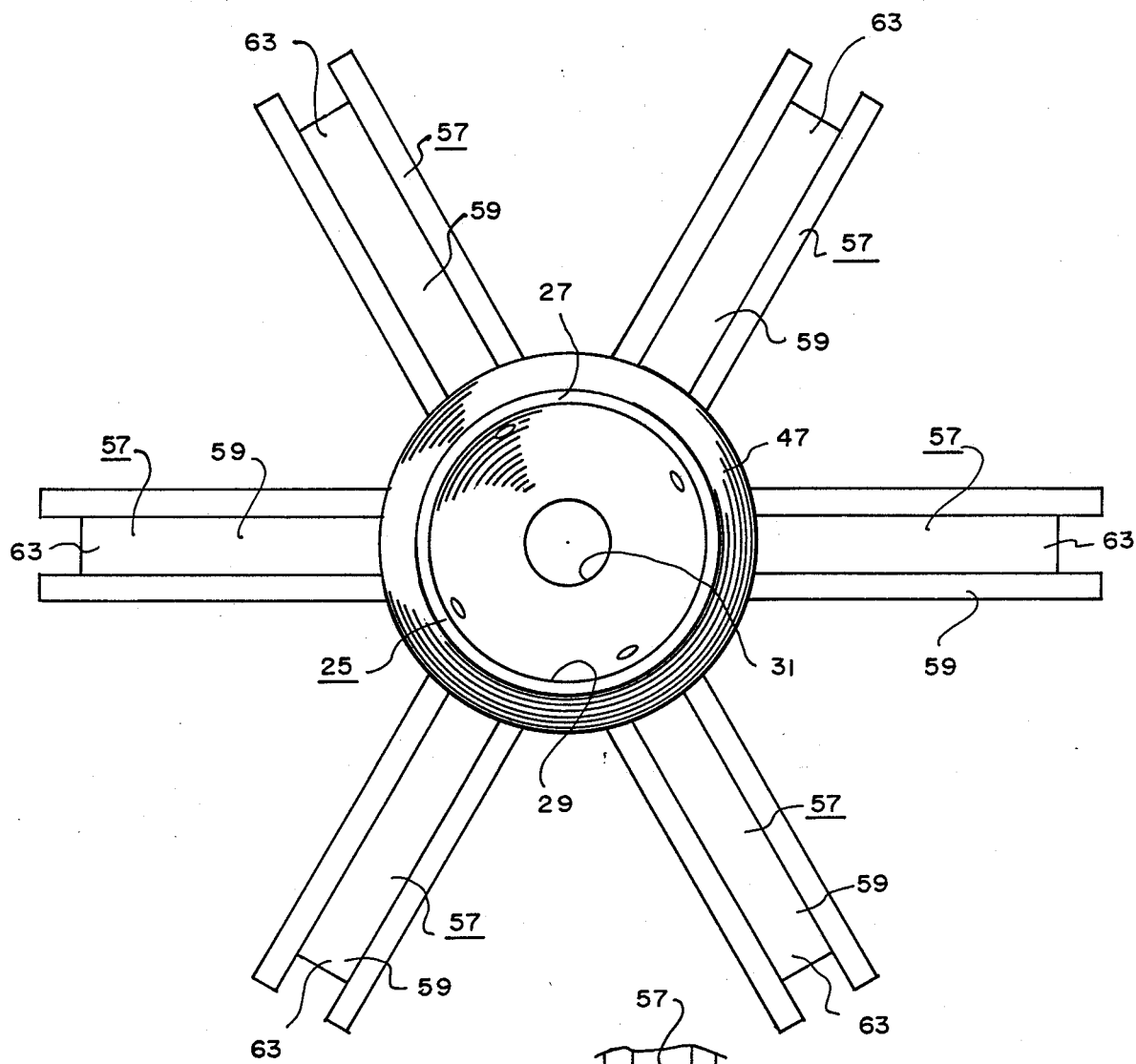
FIG. 2 is a top plan view of the grain spreader of the present invention with portions thereof removed for clarity.
Figure 4:
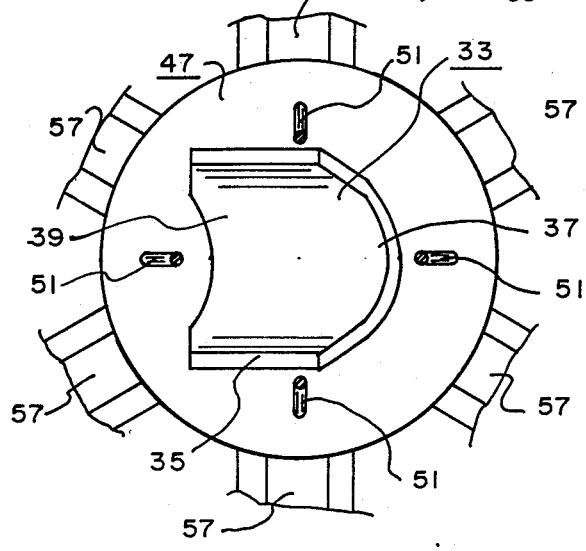
FIG. 4 is a sectional view substantially as taken on line IV—IV of FIG. 3.

The grain spreader 11 of the present invention is for use with a grain bin 13 for allowing grain G to be introduced into the interior 15 of the grain bin 13. The grain bin 13 may be of any typical construction well known to those skilled in the art having a wall structure 17 and a roof structure 19 to define the interior 15. Thus, for example, the grain bin 13 may be constructed of metal with the wall structure 17 having a substantially cylindrical shape and with the roof structure 19 having a substantially conical shape covering the upper end of the cylindrical wall structure 17. The roof structure 19 is provided with an inlet opening 21 for allowing grain to be introduced into the interior 15 of the grain bin 13 therethrough. A cylindrical collar 23 may be provided about the inlet opening 21. A lid or the like (not shown) is typically used to close the inlet opening 21 in a manner as will be apparent to those skilled in the art.

The grain spreader 11 includes a hopper means 25 for being positioned beneath the inlet opening 21 in the roof structure 19 of the grain bin 13 as clearly shown in FIG. 1 for initially receiving grain G being introduced into the interior 15 of the grain bin 13 through the inlet opening 21. The hopper means 25 preferably includes a funnel body 27 having a relatively large upper or inlet opening 29 and a relatively small lower or outlet opening 31 (see, in general, FIG. 3). The funnel body 27 may be constructed of any substantially rigid material in any manner apparent to those skilled in the art. Thus, for example, the funnel member 27 may be formed out of a sheet of galvanized metal, cut and bent in a manner as will be apparent to those skilled in the art.

The grain spreader 11 includes a chute means 33 positioned beneath the hopper means 25 as clearly shown in FIGS. 1 and 3 for receiving grain from the hopper means 25. Thus, the chute means 33 is positioned substantially directly beneath the outlet opening 31 of the funnel body 27 of the hopper means 25 to receive grain G passing through the outlet opening 31. The chute means 33 preferably includes an elongated trough body 35 having a first end 37 and a second end 39. The trough body 35 of the chute means 33 preferably extends outwardly and downwardly relative to the outlet opening 31 of the funnel body 27 of the hopper means 25 whereby grain passing from the hopper means 25 through the outlet opening 31 will fall onto the trough body 35 of the chute means 33 substantially adjacent the first end 37 thereof and will then slide down the trough body 35 of the chute means 33 and pass off the second end 39 thereof. The trough body 35 may be constructed of any substantially rigid material in any manner apparent to those skilled in the art. Thus, for example, the trough body 35 may be constructed out of galvanized sheet metal formed or bent into a trough or chute.

The grain spreader 11 includes a motor means 41 attached to the chute means 33 for causing the chute means 33 to slowly rotate. The motor means 41 preferably consists of a typical electric motor for being stationarily mounted relative to the hopper means 25 in a manner which will hereinafter become apparent and having a rotating drive shaft 43 for being coupled to the trough body 35 of the chute means 33 in a manner which will cause the trough body 35 to rotate substantially about the longitudinal axis of the funnel body 27 of the hopper means 25. More specifically, the drive shaft 43 is attached to the trough body 35 substantially adjacent the first end 37 thereof directly beneath the outlet opening 31 of the funnel body 27 to cause the second end 39 of the trough body 35 of the chute means 33 to rotate about an arc relative to the drive shaft 43. The motor means 41 may be of any specific type well known to those skilled in the art but must be capable of a low RPM output. Thus, the motor means 41 must be capable of causing the chute means 33 to rotate within a range of 1 to 150 RPM. Preferably, the motor means 41 has a 6 RPM output thereby causing the trough body 35 of the chute means 33 to rotate 6 times per minute. This slow RPM will insure that the grain being deposited on the trough body 35 of the chute means 33 from the funnel body 27 of the hopper means 25 will not be thrown therefrom with such force so as to crack the grain or the like.

The grain spreader 11 includes deflector means 45 positioned beneath the chute means 33 for receiving grain from the chute means 33 as the chute means 33 rotates and for directing the grain received from the chute means 33 outward from the hopper means 25. The deflector means 45 preferably includes a cone member 47 positioned directly beneath the chute means 33 and hopper means 25. The cone member 47 has an apex 49 positioned substantially directly beneath the outlet opening 31 of the funnel body 27 of the hopper means 25 and extends outwardly and downwardly therefrom to convey the grain away from the second end 39 of the trough body 35 of the chute means 33. The cone member 47 may be constructed of any substantially rigid material in any manner apparent to those skilled in the art. Thus, for example, the cone member 47 may be formed from a sheet of galvanized metal cut and bent in any manner apparent to those skilled in the art to form a cone. The cone member 47 is stationarily supported relative to the hopper means 25. Preferably, a plurality of rigid arm members 51 extend between the cone member 47 and the funnel body 27 of the hopper means 25 to rigidly secure the cone member 47 relative to the hopper means 25. The arm members 51 may consist of substantially rigid metal rod members bolted or otherwise secured at one end to the cone member 47 and at the other end to the funnel body 27 of the hopper means 25. The motor means 41 is preferably fixedly secured to the cone member 47 by way of a motor mount 53 or the like at a location beneath the apex 49 with the drive shaft 43 extending through the apex 49 to position the trough body 35 of the chute means 33 above the apex 49. Thus, the cone member 47 covers the motor means 41. A bearing member 55 may be attached to the cone member 47 for receiving the drive shaft 43 of the motor means 41.

The deflector means 45 preferably includes a plurality of channel members 57 positioned beneath the chute means 33 for receiving grain from the chute means 33 as the chute means 33 rotates and for directing the grain received from the chute means 33 outward from the hopper means. Each channel member 57 preferably includes an elongated trough body 59 having a first end 61 fixedly attached to the lower end of the cone member 47 and extending radially outward and downward therefrom for receiving grain from the cone member 47 and for directing the grain received from the cone member 47 radially outward and downward from the cone member 47 to a second end located remote therefrom. The trough body 59 of each channel member 57 preferably has substantially U-shaped cross section to form a channel or the like to convey grain away from the hopper means 25. The channel members 57 may be constructed of any substantially rigid material in any manner apparent to those skilled in the art. Thus, for example, the channel members 57 may be bent or otherwise formed from galvanized sheet metal and fixedly attached to the cone member 47 by bolts or the like.

The grain spreader 11 preferably includes attachment means 65 for attaching the hopper means 25 to the roof structure 19 of the grain bin 13 adjacent and directly below the inlet opening 21. The attachment means 65 may consist simply of a plurality of flexible elongated members 67 such as chains or the like having a first end 69 fixedly attached to the funnel body 27 substantially adjacent the inlet opening 29 thereof and having a second end 71, and a hook member 73 fixedly attached to the second end 71 of each elongated member 67 for being hooked over the top edge of the cylindrical collar 23 of the grain bin 13 to thereby securely position the hopper means 25, and therefore the entire grain spreader 11, within the grain bin 13 directly below the inlet opening 21 thereof.

To use the grain spreader 11, it is first positioned within a grain bin 13 in any manner apparent to those skilled in the art with the attachment means 65 being used to position the hopper means 25 directly below the inlet opening 21 in the roof structure 19 of the grain bin 13. An electrical line 75 is extended between a typical source of electrical energy and the motor means 41 to energize the motor means 41. A typical on-off switch 77 is positioned in the electrical line 75 at a convenient location to allow the motor means 41 to be selectively energized and deenergized. When grain G is introduced into the interior 15 of the grain bin 13 through the inlet opening 21 in the roof structure 19 thereof in any conventional manner, substantially all of the grain G will pass into the hopper means 25. Gravity will then cause the grain G in the hopper means 25 to flow out through the outlet opening 31 and onto the trough body 35 of the chute means 33. With the motor means 41 energized to cause the trough body 35 of the chute means 33 to slowly rotated, the chute means 33 will evenly direct the grain G onto the cone member 47. Gravity will then cause the grain G to fall off the cone member 47 with a portion of the grain G passing onto the trough body 59 of each channel member 57. Gravity will then cause the grain G to slide along the trough body 59 of each channel member 57 radially outward and downward from the cone member 47 toward the wall structure 17 of the grain bin 13, causing the grain G to be substantially evenly distributed within the interior 15 of the grain bin 13.

The size and angles of the various components of the grain spreader 11 may vary depending on the type and volume of grain G being introduced into the grain bin 13, the size of the grain bin 13, etc. The grain spreader 11 can be sized to handle any grain amount from 1 bushel per hour up.

Although the present invention has been described and illustrated with respect to a preferred embodiment thereof and a preferred use therefore, it is not to be so limited since changes and modifications may be made therein within the full intended scope of the invention.

We claim:

1. A grain spreader for use with a grain bin including roof structure having an inlet opening for allowing grain to be introduced into the interior of the grain bin, said grain spreader comprising:
   (a) hopper means positioned beneath the inlet opening in the roof structure of the grain bin and non-rotatably mounted relative to said grain bin for initially receiving grain being introduced into the interior of the grain bin through the inlet opening; said hopper means having a substantially open funnel-shaped interior, an unblocked upper inlet opening and an unblocked lower discharge opening; said inlet opening being larger than said outlet opening;
   (b) chute means positioned beneath said hopper means for receiving grain from said hopper means; said chute means comprising a single elongated open-trough body having a first end positioned substantially beneath said outlet opening of said hopper means for receiving grain from said hopper means and having a second end located outwardly and downwardly from said outlet opening of said hopper means for discharging grain therefrom outward and downward from said outlet opening of said hopper means;
   (c) motor means attached to said chute means for causing said chute means to slowly rotate; and
   (d) deflector means positioned beneath said chute means and non-rotatably mounted relative to said grain bin for receiving grain from second end of said chute means as said chute means rotates and for directing the grain received from said chute means outward from said hopper means, said deflector means including a cone member positioned beneath said chute means for receiving grain from said second end of said chute means as said chute means rotates and for directing the grain received from said chute means outward and downward from said hopper means.

2. The grain spreader of claim 1 in which said deflector means includes a plurality of channel members attached to said cone member and extending radially outward and downward therefrom for receiving grain from said cone member and for directing the grain received from said cone member radially outward and downward from said cone member.

3. The grain spreader of claim 2 in which said motor means causes said chute means to rotate within a range of 1 revolution per minute and 150 revolutions per minute.

4. The grain spreader of claim 2 in which said motor means causes said chute means to rotate at a speed of 6 revolutions per minute.

5. The grain spreader of claim 2 in which said channel members are rigidly secured to said cone member, in which is included arm members extending between said hopper means and said cone member for rigidly securing said hopper means and said cone member relative to one another, and in which said motor means is rigidly secured to said cone member.

* * * * *